(12) United States Patent
Angell et al.

(10) Patent No.: US 8,107,677 B2
(45) Date of Patent: Jan. 31, 2012

(54) MEASURING A COHORT'S VELOCITY, ACCELERATION AND DIRECTION USING DIGITAL VIDEO

(75) Inventors: Robert Lee Angell, Salt Lake City, UT (US); David Wayne Cosby, Raleigh, NC (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 12/034,380

(22) Filed: Feb. 20, 2008

(65) Prior Publication Data
US 2009/0208054 A1 Aug. 20, 2009

(51) Int. Cl.
*G06K 9/00* (2006.01)
(52) U.S. Cl. ......... 382/103; 382/154; 382/285; 348/169
(58) Field of Classification Search .................. 382/154, 382/103, 285; 345/419–427; 356/12–14; 348/42–60, 169; 359/462–477; 352/57–65; 33/20.4; 353/7–9; 378/41–42; 396/324–331
See application file for complete search history.

(56) References Cited

U.S. PATENT DOCUMENTS

| 6,449,010 | B1 * | 9/2002 | Tucker ........................... 348/157 |
| 6,690,451 | B1 * | 2/2004 | Schubert ....................... 356/3.14 |
| 6,816,186 | B2 * | 11/2004 | Luke et al. ..................... 348/159 |
| 2003/0020808 | A1 * | 1/2003 | Luke et al. ..................... 348/47 |
| 2007/0279494 | A1 * | 12/2007 | Aman et al. ................... 348/169 |
| 2008/0129825 | A1 * | 6/2008 | DeAngelis et al. ........... 348/169 |

\* cited by examiner

*Primary Examiner* — Aaron W Carter
(74) *Attorney, Agent, or Firm* — Yee & Associates, P.C.; John R. Pivnichny

(57) ABSTRACT

A computer implemented method, apparatus, and computer program product for identifying positional data for an object moving in an area of interest. Positional data for each camera in a set of cameras associated with the object is retrieved. The positional data identifies a location of each camera in the set of cameras within the area of interest. The object is within an image capture range of each camera in the set of cameras. Metadata describing video data captured by the set of cameras is analyzed using triangulation analytics and the positional data for the set of cameras to identify a location of the object. The metadata is generated in real time as the video data is captured by the set of cameras. The positional data for the object is identified based on locations of the object over a given time interval. The positional data describes motion of the object.

24 Claims, 7 Drawing Sheets

MEASURING A COHORT'S VELOCITY, ACCELERATION AND DIRECTION USING DIGITAL VIDEO

BACKGROUND OF THE INVENTION

1. Field of the Invention

The present invention relates generally to an improved data processing system, and more specifically, to a method and apparatus for digital video. More particularly, the present invention is directed to a computer implemented method, apparatus, and computer usable program code for determining velocity, acceleration, and direction of an object using digital video data.

2. Description of the Related Art

Radar, also referred to as radio detection and ranging, uses electromagnetic waves to identify the range, direction, and/or speed of moving objects, such as cars, aircraft, and ships. Radar transmits radio waves toward a target object. The radio waves that are reflected back by the target object are detected by the radar system and used to measure the speed of the target object.

Laser radar, also referred to as lidar, ladar, Airborne Laser Swath Mapping (ALSM), and laser altimetry, uses light instead of radio waves. Laser radar typically uses short wavelengths of the electromagnetic spectrum, such as ultraviolet and near infrared. Thus, an object typically needs to be able to reflect the transmitted wavelength for radar and/or laser radar systems to determine the speed of the object.

BRIEF SUMMARY OF THE INVENTION

The illustrative embodiments provide a computer implemented method, apparatus, and computer program product for identifying positional data for an object. In one embodiment of the present invention, positional data for each camera in a set of cameras associated with the object is retrieved. The positional data identifies a location of each camera in the set of cameras within the area of interest. The object is within an image capture range of each camera in the set of cameras. Metadata describing video data captured by the set of cameras is analyzed using triangulation analytics and the positional data for the set of cameras to identify a location of the object. The metadata is generated in real time as the video data is captured by the set of cameras. The positional data for the object is identified based on locations of the object over a given time interval. The positional data describes motion of the object.

DETAILED DESCRIPTION OF THE PREFERRED EMBODIMENT

Figure 1:
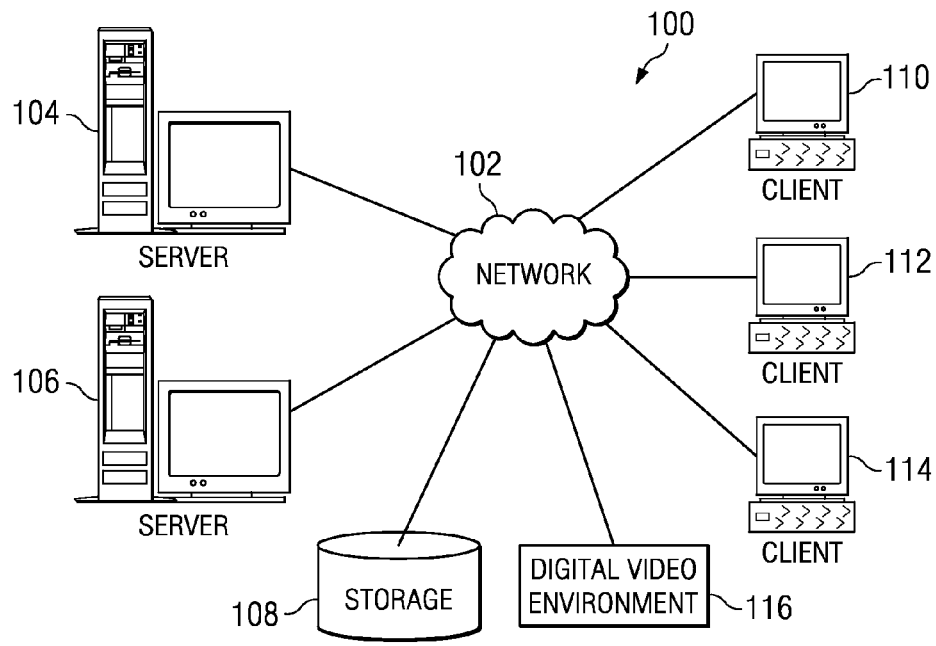
FIG. 1 is a block diagram of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
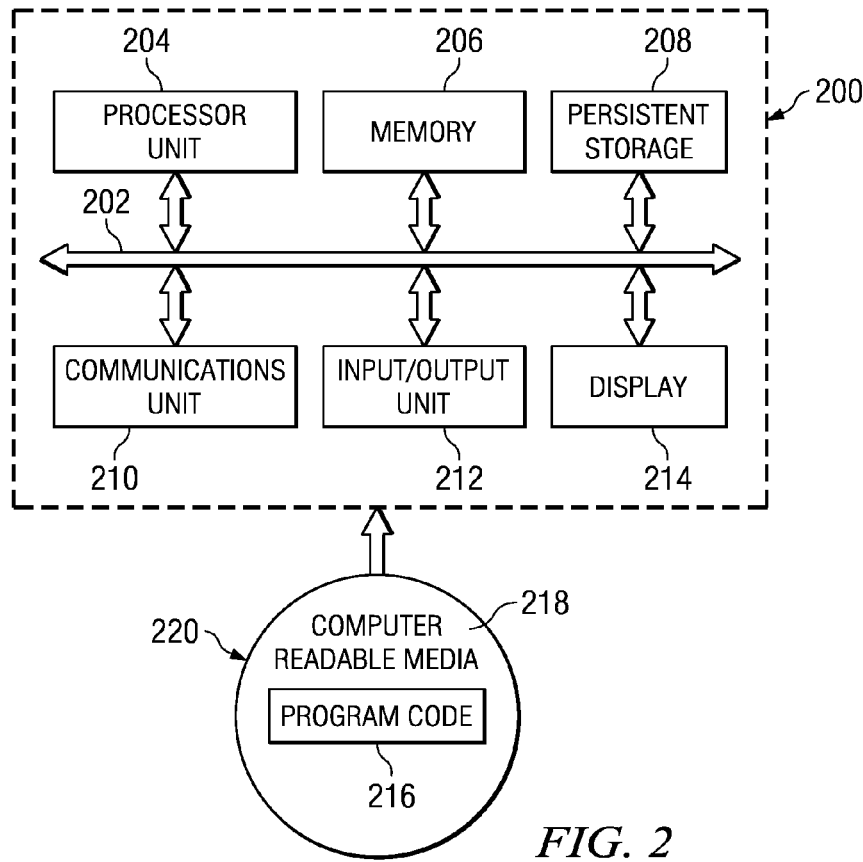
FIG. 2 is a block diagram of a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Digital video environment 116 is an environment comprising two or more cameras. Digital video environment 116 may be an internal environment, such as, without limitation, inside a shopping mall, an airport, a train station, a bus depot, a parking garage, an indoor sports arena, a convention center, or any other environment inside a structure. In another embodiment, digital video environment 116 is an external environment, such as, without limitation, a freeway, highway, public streets, private roads, an open-air pavilion, an airport runway, a park, a sidewalk, an open-air parking lot, or any other external environment. In yet another embodiment, digital video environment 116 is a combination of an internal environment and an external environment.

For example, and without limitation, in one embodiment, digital video environment 116 in FIG. 1 is an airport environment, including areas inside one or more airport buildings, ticketing areas, terminals, areas inside parking garages, areas in open air parking areas, roadways associated with the airport, one or more curbside baggage check areas, one or more indoor baggage check areas, restaurants, gift shops, news stands, coffee shops, and/or stores in airport terminals and waiting areas. In another embodiment, digital video environment 116 in FIG. 1 is an area associated with a portion of a city street.

Digital video environment 116 spans an area of any size, as well as any type of terrain, that is within the field of view of two or more cameras, such as, without limitation, digital video cameras. Digital video environment 116 may be limited to an area inside a building or encompass an entire building. Digital video environment 116 may cover a complex of buildings and outdoor areas surrounding the complex. In another embodiment, digital video environment 116 may encompass an entire city or a set of two or more cities.

Digital video environment 116 may also encompass two or more non-contiguous areas. In other words, there may be one or more areas within digital video environment 116 in which objects are within the field of view of two or more digital video cameras and there may be one or more areas within digital video environment 116 in which objects are not within the field of view of at least two digital video cameras. Thus, the embodiments do not require that a digital video environment provide digital video coverage by two or more cameras of every object or every area within the environment.

In FIG. 1, digital video environment 116 is connected to network 102. Digital video environment 116 transmits digital video data gathered by the two or more digital video cameras to one or more computing devices for processing and/or analysis, such as server 104 and/or server 106. In this example, server 104 comprises digital video analysis engine software for processing and/or analyzing digital video data and dynamically generating metadata describing objects in digital video environment 116, as the digital video data is generated. The metadata is generated by the digital video analysis engine software based on video captured by the two or more cameras without intervention by a human user.

In another embodiment, network data processing system 100 is part of a grid computing system. A grid computing system is a distributed computing system in which multiple computing devices are connected together via a network, such as network 102. Each computing device in the grid is a grid node. A grid job is a processing task to be completed by the grid computing system. A grid job may be performed by one or more node in the grid. For example, server 104-106 and clients 110-114 may be nodes in a grid. A grid job on the grid may be performed in part by server 104 and in part by client 110. In this example, the digital video data gathered by the digital video cameras in digital video environment 116 are transmitted to one or more nodes in the grid computing system for processing and/or analysis to determine the velocity, acceleration, and direction of one or more objects in digital video environment.

However, in another embodiment, digital video environment 116 is not required to be connected to network 102. Instead, digital video environment 116 comprises one or more computing devices located locally to digital video environment 116, such that digital video data gathered by digital video cameras in digital video environment 116 are processed by one or more computing devices in digital video environment 116 without transmitting the digital video data to a remote data processing system, such as server 104 or server 106. In this example, the one or more computing devices local to digital video environment 116 process and/or analyze the digital video data gathered by the two or more digital video cameras in digital video environment 116 to determine the velocity, acceleration, and/or direction of movement associated with one or more objects in digital video environment 116.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments recognize that many environmental factors may make it nearly impossible to use radar and/or laser radar technology to determine the object's velocity, acceleration, and direction. In addition, some objects may be incapable of producing a detectable reflection. In such cases, the objects are invisible to the radar and/or laser radar systems. Therefore, the embodiments recognize a need for measuring an object's velocity, acceleration, and/or direction using digital video data rather than relying solely on radar and/or laser radar systems.

The illustrative embodiments provide a computer implemented method, apparatus, and computer program product for identifying positional data for an object moving in an area of interest. In one embodiment, positional data for each camera in a set of cameras associated with the object is retrieved. The positional data identifies a location of the each camera in the set of cameras within the area of interest. The object is within an image capture range of the each camera in the set of cameras. Metadata describing video data captured by the set of cameras is analyzed using triangulation analytics and the positional data for the set of cameras to identify a location of the object. The metadata is generated in real time as the video data is captured by the set of cameras. The positional data for the object is identified based on locations of the object over a given time interval. The positional data describes motion of the object.

Figure 3:
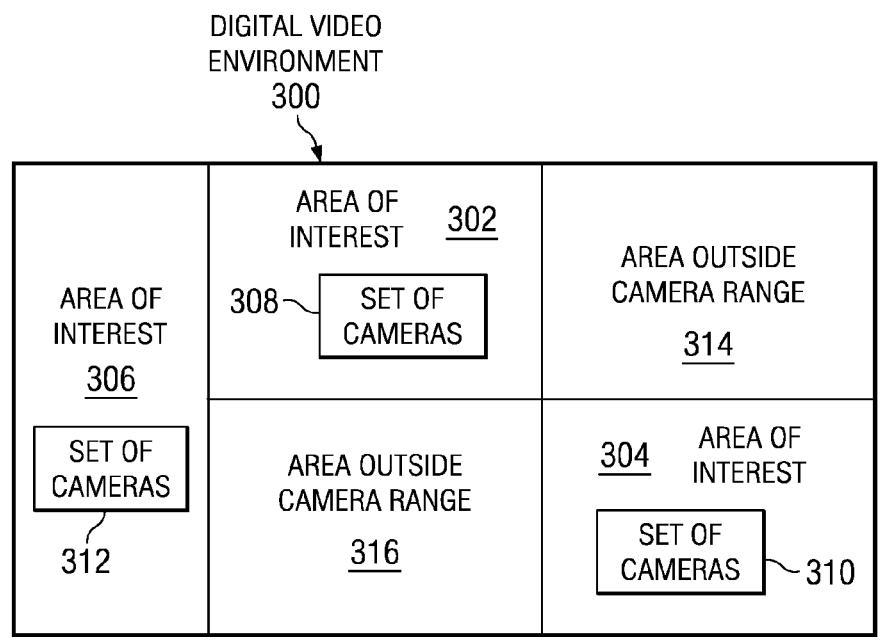
FIG. 3 is a block diagram of a digital video environment in accordance with an illustrative embodiment.

Referring now to FIG. 3, a block diagram of a digital video environment is shown in accordance with an illustrative embodiment. Digital video environment 300 is an environment comprising at least two digital video cameras for capturing video data. Digital video environment 300 is an environment such as digital video environment 116 in FIG. 1.

Digital video environment 300 may encompass two or more non-contiguous areas having at least two digital video cameras. In other words, there may be one or more areas within digital video environment 300 in which objects are within the field of view of two or more digital video cameras, such as area of interest 302-306. An area of interest, such as area of interest 302-306, is an area in which two or more digital video cameras are capturing digital video of one or more objects within the area. For example, area of interest 302 includes set of cameras 308. Set of cameras 308 comprises two or more video cameras. Area of interest 304 includes set of cameras 310 and area of interest 306 includes set of cameras 312. Set of cameras 310 and 312 also include two or more cameras for capturing images of one or more objects.

As used herein, an object comprises a person or a thing. An object may be a human being, an automobile, an airplane, a boat, a cart, a brief case, a piece of luggage, an animal, or any other living or non-living thing. In one embodiment, an object may be a cohort. A cohort is a member of a group that shares at least one characteristic in common with the other members of the cohort group. A cohort may be a person or a thing.

In this example, digital video environment 300 also includes one or more areas within digital video environment 300 in which objects are not within the field of view of at least two digital video cameras, such as area outside camera range 314 and 316.

Thus, digital video environment 300 has at least one area within a range of two or more video cameras. However, every area within digital video environment 300 is not required to be within an image capture range of two or more video cameras. An image capture range is the range within which a camera can capture images. If an object is within the image capture range of a camera, the camera can capture images of the object. In other words, the object is within the field of view or the recording range of the camera.

Figure 4:
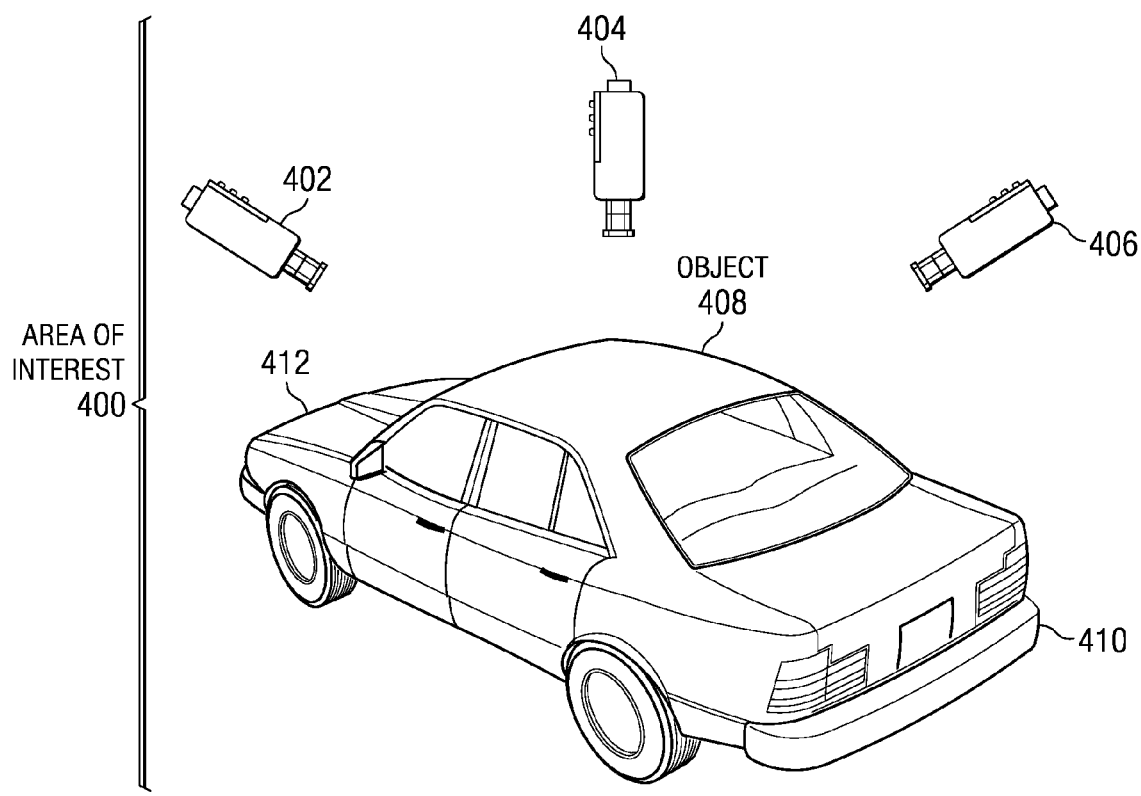
FIG. 4 is a block diagram of an area of interest having a set of cameras in accordance with an illustrative embodiment.

FIG. 4 is a block diagram of an area of interest having a set of cameras in accordance with an illustrative embodiment. Area of interest 400 is an area having two or more video cameras, such as area of interest 302-306 in FIG. 3. Cameras 402-406 are cameras for capturing images of one or more objects in area of interest 400, such as, without limitation, object 408.

A camera is any type of known or available device for capturing images and/or audio, such as, without limitation, an optical image capture device, an infrared imaging device, a spectral or multispectral device, a sonic device, or any other type of image producing device. For example, a camera may be implemented as, without limitation, a digital video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area.

Various lenses, filters, and other optical devices such as zoom lenses, wide angle lenses, mirrors, prisms and the like may also be used with cameras 402-406 to assist in capturing the desired view. Cameras 402-406 may be fixed in a particular orientation and configuration, or it may, along with any optical devices, be programmable in orientation, light sensitivity level, focus or other parameters. For example, in one embodiment, cameras 402-406 are capable of rotating, tilting, changing orientation, and panning. In another embodiment, one or more cameras in cameras 402-406 is a robot camera or a mobile camera that is capable of moving and changing location, as well as tilting, panning, and changing orientation. Programming data may be provided via a computing device, such as server 104 in FIG. 1.

In this embodiment, each of cameras 402-406 are located in a fixed location. However, cameras 402-406 are capable of moving and/or rotating along one or more directions, such as up, down, left, right, and/or rotate about an axis of rotation to change a field of view of the camera without changing location of the camera. Cameras 402-406 may also be capable of rotating about an axis to keep a person, animal, vehicle or other object in motion within the field of view of the camera. In other words, the camera may be capable of moving about an axis of rotation in order to keep a moving object within a viewing range of the camera lens.

Cameras 402-406 capture images associated with object 408 within the field of view of cameras 402-408. In this example, object 408 is depicted as a car. However, object 408 may be any type of object, including, but without limitation, a person, an animal, a motorcycle, a boat, an aircraft, a cart, or any other type of moving object. In addition, object 408 is not required to be moving under the power of object 408. Object 408 may be pushed, pulled, carried, or dragged by another object. Thus, object 408 in this example may be a car moving under its own power or a car that is being pulled or towed by another vehicle or pushed by one or more human users.

Cameras 402-406 transmit the video data, including images of object 408, to a video analysis system for processing into metadata. The video data may also include images of identifying features of the object, such as, without limitation, a face of a human user, license plate 410 and/or 412, an identification badge, a vehicle identification number (VIN), or any other identifying markings or features of the object. An analytics server can then analyze the images to identify the object using license plate recognition analytics, facial recognition analytics, behavior analysis analytics, or other analytics to identify a particular object and/or distinguish one object from another object.

In this embodiment, cameras 402-406 are stationary in a single location. In another embodiment, one or more cameras in cameras 402-406 are mobile cameras capable of changing locations. For example, cameras 402-406 may include one or more robot cameras.

Figure 5:
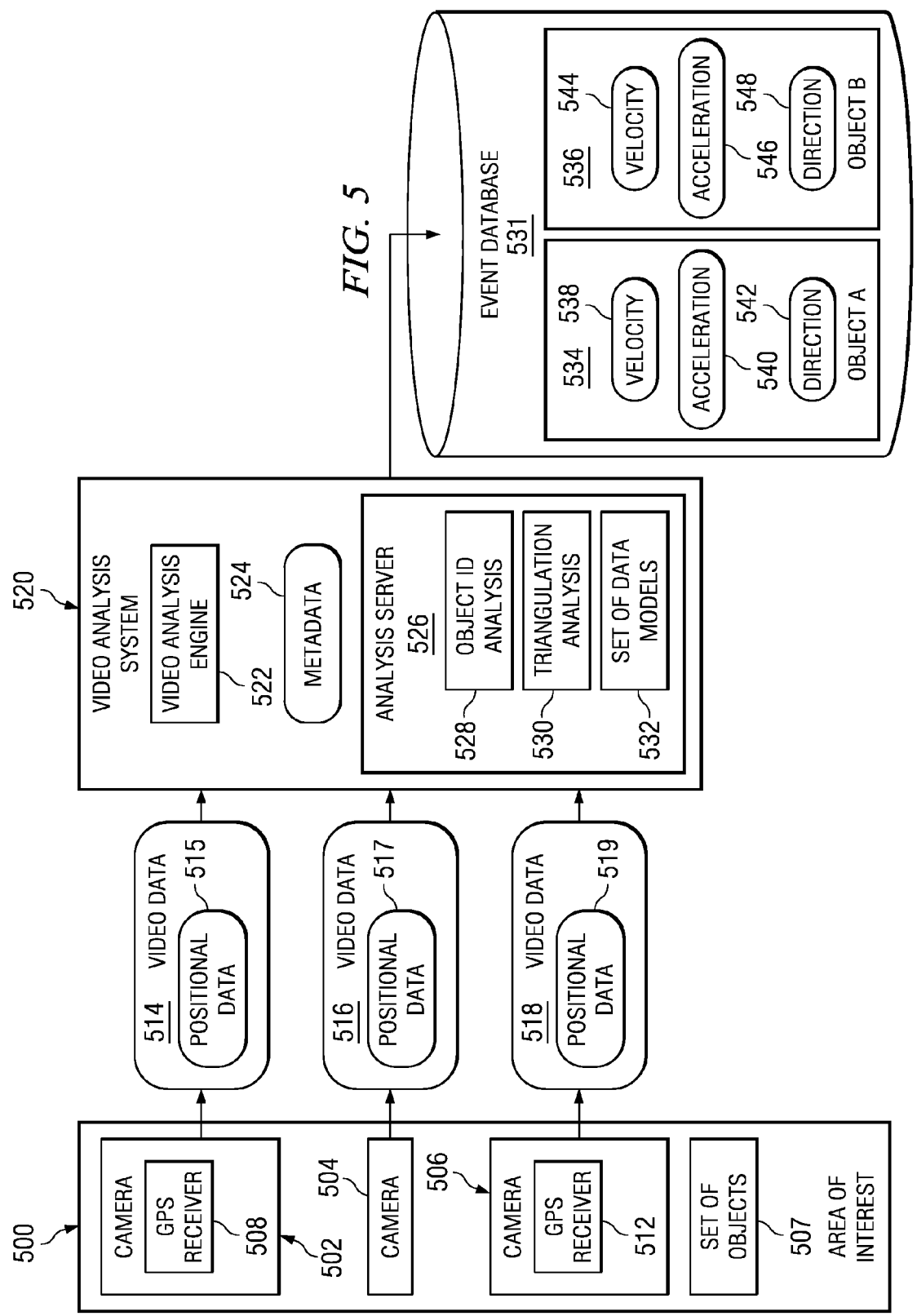
FIG. 5 is a block diagram of a smart video analysis system for identifying a velocity, acceleration, and/or direction of an object in an area of interest in accordance with an illustrative embodiment.

FIG. 5 is a block diagram of a smart video analysis system for identifying a velocity, acceleration, and/or direction of an object in an area of interest in accordance with an illustrative embodiment. Area of interest 500 is an area having three or more cameras, such as, without limitation, cameras 502-506. Cameras 502-506 are image capture devices, such as cameras 402-406 in FIG. 4.

Set of objects 507 is a set of one or more objects within a range of cameras 502-506. The objects in set of objects 507 may be any type of objects, such as, without limitation, a person, animal, or a thing. Set of objects 507 may also include one or more cohort groups, and/or one or more members of a cohort group.

In this example, cameras 502-506 include global positioning systems (GPS) receivers 508-512. GPS receivers 508-512 are receivers for receiving signals from a set of two or more global positioning system satellites in the global navigation satellite system (GNSS). GPS receivers 508-512 determine a position of a camera associated with each GPS receiver using the signals from the set of global positioning system satellites. For example, GPS receiver 508 calculates a location of camera 502 using signals from the set of global positioning system satellites.

Camera 502 sends video data 514 and positional data 515 to video analysis system 520. Video data 514 is a stream of video images captured by camera 502. Positional data 515 is data describing a location of camera 502. Positional data 515 may be a location in latitude and longitude, a location on a map, a location in x,y,z coordinates, or any other type of positional data.

Likewise, camera 506 generates video data 518 and GPS receiver 512 automatically generates positional data 519 based on signals from the global positioning system satellite network. Camera 506 transmits video data 518 and 519 to video analysis system 520.

Camera 504 in this example does not include a GPS receiver. A location of camera 504 is determined by a human user. The human user manually enters positional data 517 identifying the location of camera 517 into video analysis system 520. The human user identifies the location of the camera 504 when camera 504 is calibrated and mounted in a given location in area of interest 500.

Video data, such as video data 514, 516, and 518, may be transmitted to video analysis system 520 using a wired or wireless network connection, such as, without limitation, Bluetooth and WiFi technology. In this example, video data 514, 516, and 518 is transmitted as a continuous stream of video data as the video data is generated by cameras 502-506.

Video analysis system 520 is data processing system architecture for analyzing camera images and other video data to dynamically identify an identification of an object, a velocity of the object, an acceleration of the object, and/or a direction of movement of the object based on the video data. Video analysis system 520 is a stationary digital video system or a mobile digital video analysis system.

Video analysis system 520 may be implemented using any known or available software for performing video analytics, such as, without limitation, facial recognition analytics, license plate recognition analytics, radar analytics, and object identification analytics to generate metadata describing the video images of the object, such as video analytics engine 522.

Video analytics engine 522 is software for dynamically generating metadata 524 describing the object and/or events associated with video images captured by one or more cameras. Video analytics engine 522 includes analytics for automatically analyzing video images in video data and generating metadata describing one or more objects in the video images. In this example, video analytics engine 522 is implemented as IBM® smart surveillance system (S3) software.

Analysis server 526 is implemented as any type of known or available server for processing and/or analyzing metadata 524 and/or any other additional object data to dynamically identify an object, a velocity of the object, an acceleration of the object, and/or a direction of movement by the object. Analysis server 526 uses object ID analysis 528 to determine an identity of an object. The identity of the object may be a license plate number of a car, a name of an owner of a vehicle, a name of a person, a make, model, and/or year of a vehicle, a color of a vehicle, an identifier of a person or thing, or any other means of identifying a given object based on metadata 524 and/or other object data.

Analysis server 526 comprises triangulation analysis 530. Triangulation analysis 530 is a software component for determining the location of a given object by triangulating positional data from a set of cameras, such as positional data 515-518. Triangulation analysis 530 utilizes the images of the given object captured by a set of cameras and the positional data for the set of cameras to triangulate a position of the given object. The cameras in the set of cameras remain stationary. Thus, triangulation analysis 530 utilizes the positions of the cameras in the set of cameras as stationary points of reference for determining the position of the given object.

Triangulation analysis 530 in this example uses video data and positional data from a set of three cameras. However, in another embodiment triangulation analysis 530 uses video data and positional data from four or more cameras to determine the location of the given object.

Set of data models 532 includes one or more data models. A data model is a model for structuring, defining, organizing, imposing limitations or constraints, and/or otherwise manipulating data and metadata to produce a result. A data model may be generated using any type of modeling method or simulation including, but not limited to, a statistical method, a data mining method, a causal model, a mathematical model, a marketing model, a behavioral model, a psychological model, a sociological model, or a simulation model. One or more data models in set of data models 532 are utilized to generate the velocity, acceleration, and/or direction data for a given object.

In this example, analysis server 526 analyzes metadata 524 describing video images of one or more objects in set of objects 507 to identify object A 534 and object B 536. Triangulation analysis 530 determines a location of object A 534 and object B 536. As video data 514, 516, and 518 continues to stream into video analysis system 520, video analytics engine 532 continues to dynamically generate metadata 524 describing the images in the video data captured by cameras 502-506. Analysis server 526 continues to dynamically identify the location and position of objects 534-536 in real time as the objects change location and position in real time. The location and position data is stored in event database 531.

Event database 531 is a data storage device for storing metadata 524, location and position data of one or more objects, as well as data describing the velocity, acceleration, and/or direction of one or more objects over one or more time intervals. Event database 531 may be implemented in a non-volatile random access memory, a hard disk, a flash memory, a compact disk rewritable (CD-RW), a local data storage device, a remote data storage device, or any other type of data storage device, such as, without limitation, storage 108 in FIG. 1.

Direction, velocity, and acceleration are examples of positional data for an object. The positional data for the object describes motion of the object based on locations of the object over a given time interval or a set of two or more time intervals. In this example, analysis server 526 uses triangulation analytics 530 and one or more data models in set of data models 532 to identify velocity 538, acceleration 540, and direction 542 of movement of object A 534 based on the changing location and position data. Likewise, analysis server 526 also dynamically identifies velocity 544, acceleration 546, and direction 548 of movement of object B 536 based on the video images captured by cameras 502-506 in real time.

Video analysis system 500 optionally determines probable goods and/or services that may be desired based on the object identity and the direction, velocity, and/or acceleration of the object over a given time interval. For example, if an object is identified as a car having a given license plate number, the event metadata is analyzed to determine if the car is frequently driven faster than the posted speed limit a threshold number of times, the car frequently comes to hard stops rather than gradual stops, and/or data indicating the vehicle is being driven in a manner that will increase wear and tear on the breaks and tires. In other words, Video analysis system 520 may also use the metadata to determine whether an object is operated under conditions that may lead to premature wear and tear on the object or cohort, such as the brakes, body, muffler, and other potential features of the car may be wearing out much faster under current and/or past operating conditions than if the car was driven by a driver that accelerates and stops the car in a more mellow or gradual fashion. Video analysis system 520 then optionally identifies a set of potential vendors and/or service providers associated with the identified probable goods and/or services, such as, without limitation, brake shops, muffler shops, gas stations, or other vendors and/or service providers.

In one embodiment, GPS receivers, such as GPS receivers 508 and 512, may be used to calibrate a grid-like environment of cameras. This would allow for a mobile or moving grid of video, audio, and other sensors for gathering data associated with one or more moving objects. GPS receivers 508 and 512 ensure that each camera has accurate positional data to ensure an accurate calculation of direction, velocity, and acceleration of an object is made.

In this embodiment, cameras 502-506 are stationary cameras. In another embodiment, cameras 502-506 include mobile cameras. In this example, one or more stationary points of reference are established. Cameras 502-506 are calibrated to determine the distance between cameras 502-506 and the set of stationary points of reference. When a camera moves or otherwise changes location, analysis server 526 determines the location of the camera relative to one or more stationary points of reference and/or one or more other cameras and generates positional data for the camera based on the location of the camera.

Figure 6:
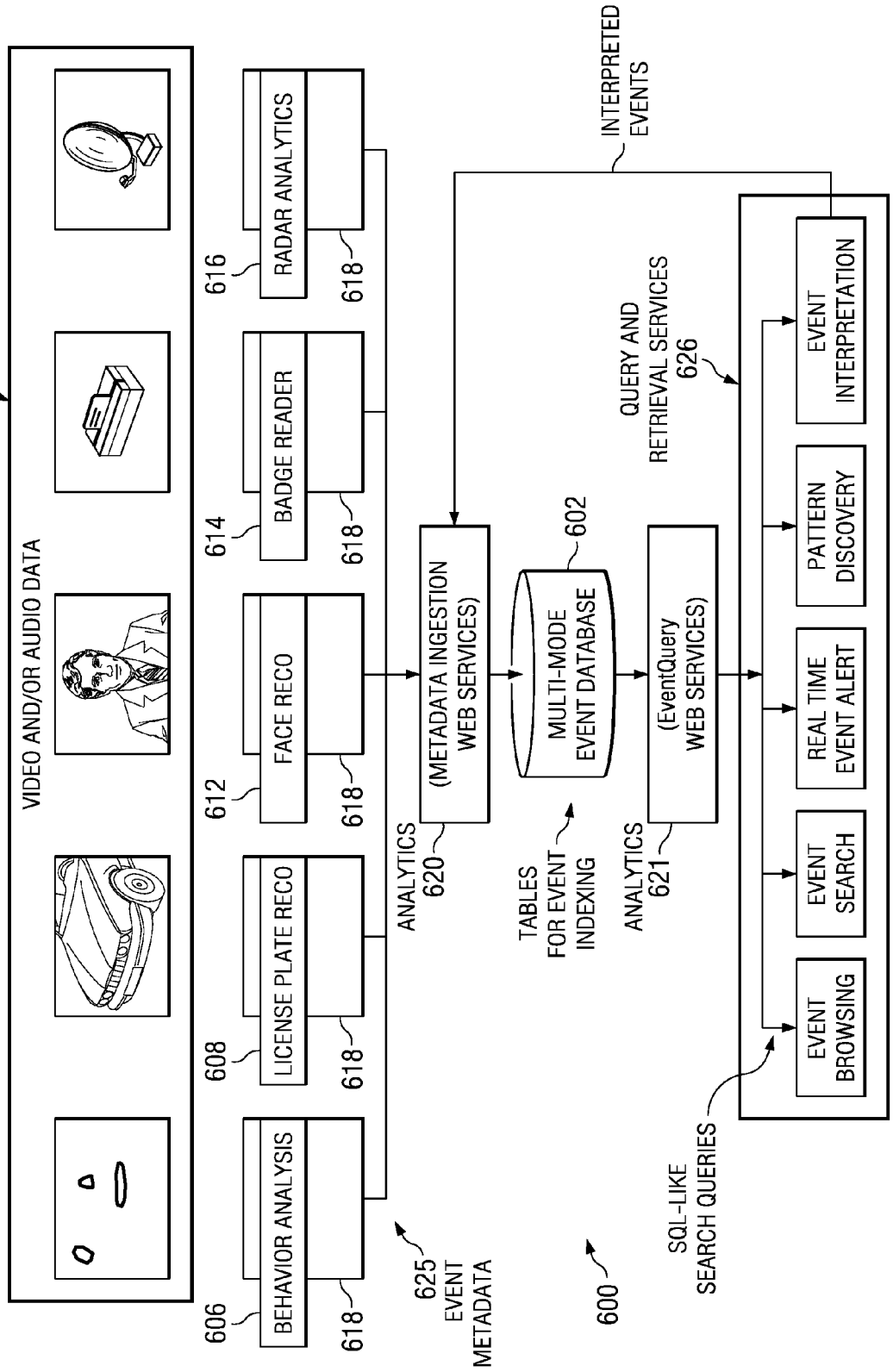
FIG. 6 is a diagram of a video analytics engine in accordance with an illustrative embodiment.

With reference now to FIG. 6, a diagram of a video analytics engine is depicted in accordance with an illustrative embodiment. Video analysis system 600 is software architecture for generating metadata describing images captured by a set of video cameras, such as video analytics engine 522 in FIG. 5. Video analysis system 600 may be implemented using any known or available software for image analytics, facial recognition, license plate recognition, and sound analysis. In this example, video analysis system 600 is implemented as IBM® smart surveillance system (S3) software.

Video analysis system 600 utilizes computer vision and pattern recognition technologies, as well as video analytics, such as video analytics engine 522 in FIG. 5, to analyze video images captured by one or more situated cameras and microphones. The analysis of the video data generates events of interest in the environment. For example, an event of interest at a departure drop off area in an airport includes the position and location of cars, the position and location of passengers, and the position and location of other moving objects. As video analysis technologies have matured, they have typically been deployed as isolated applications which provide a particular set of functionalities.

Video analysis system 600 includes video analytics software for analyzing video images captured by a camera and/or audio captured by an audio device associated with the camera. The video analytics engine includes software for analyzing video and/or audio data 604. In this example, the video analytics engine in video analysis system 600 processes video and/or audio data 604 associated with one or more objects into data and metadata, such as metadata 524 in FIG. 5.

Video and/or audio data 604 is data captured by the set of cameras. Video and/or audio data 604 may be a sound file, a media file, a moving video file, a still picture, a set of still pictures, or any other form of image data and/or audio data. Video and/or audio data 604 may also be referred to as detection data. Video and/or audio data 604 may include images of a customer's face, an image of a part or portion of a customer's car, an image of a license plate on a customer's car, and/or one or more images showing a customer's behavior. An image showing a customer's behavior or appearance may show a customer wearing a long coat on a hot day, a customer walking with two small children which may be the customer's children or grandchildren, a customer moving in a hurried or leisurely manner, or any other type of behavior or appearance attributes of a customer, the customer's companions, or the customer's vehicle.

In this example, video analytics engine 600 architecture is adapted to satisfy two principles. 1) Openness: The system permits integration of both analysis and retrieval software made by third parties. In one embodiment, the system is designed using approved standards and commercial off-the-shelf (COTS) components. 2) Extensibility: The system should have internal structures and interfaces that will permit for the functionality of the system to be extended over a period of time.

The architecture enables the use of multiple independently developed event analysis technologies in a common framework. The events from all these technologies are cross indexed into a common repository or a multi-mode event database 602 allowing for correlation across multiple audio/video capture devices and event types.

Video analysis system 600 includes the following illustrative analytical technologies integrated into a single system to generate metadata describing one or more objects in an area of interest based on video data from a set of cameras, such as set of cameras 308 in FIG. 3. The analytical technologies are technologies associated with video analytics, such as video analytics engine 522 in FIG. 5. In this example, the video analytics technologies comprise, without limitation, behavior analysis technology 606, license plate recognition 608, face detection/recognition technology 612, badge reader technology 614, and radar analytic technology 616.

Behavior analysis technology 606 detects and tracks moving objects and classifies the objects into a number of predefined categories by analyzing metadata describing images captured by the cameras. As used herein, an object may be a human, an object, a container, a cart, a bicycle, a motorcycle, a car, or an animal, such as, without limitation, a dog. Behavior analysis technology 606 may be used to analyze images captured by cameras deployed at various locations, such as, without limitation, overlooking a roadway, a parking lot, a perimeter, or inside a facility.

License plate recognition technology 608 may be utilized to analyze images captured by cameras deployed at the entrance to a facility, in a parking lot, on the side of a roadway or freeway, or at an intersection. License plate recognition technology 608 catalogs a license plate of each vehicle moving within a range of two or more video cameras associated with video analysis system 600. For example, license plate recognition technology 608 is utilized to identify a license plate number on license plate 410 or 412 associated with the car in FIG. 4.

Face detection/recognition technology 612 is software for identifying a human based on an analysis of one or more images of the human's face. Face detection/recognition technology 612 may be utilized to analyze images of objects captured by cameras deployed at entry ways, or any other location, to capture and recognize faces.

Badge reader technology 614 may be employed to read badges. The information associated with an object obtained from the badges is used in addition to video data associated with the object to identify an object and/or a direction, velocity, and/or acceleration of the object. Events from access control technologies can also be integrated into video analysis system 600.

The data gathered from behavior analysis technology 606, license plate recognition technology 608, face detection/recognition technology 612, badge reader technology 614, radar analytics technology 616, and any other video/audio data received from a camera or other video/audio capture device is received by video analysis system 600 for processing into metadata 625. Event metadata 625 is metadata describing one or more objects in an area of interest, such as metadata 524 in FIG. 5.

The events from all the above analysis technologies are cross indexed into a single repository, such as multi-mode database 602. In such a repository, a simple time range query across the modalities will extract license plate information, vehicle appearance information, badge information, object location information, object position information, vehicle make, model, year and/or color, and face appearance information. This permits an analysis server, such as analysis server 526 in FIG. 5, to easily correlate these attributes. The architecture of video analysis system 600 also includes one or more smart analytics engines 618, which house event analysis technologies.

Video analysis system 600 further includes middleware for large scale analysis, such as metadata ingestion web services (analytics) 620 and web services analytics (analytics) 621, which provides infrastructure for indexing, retrieving, and managing event metadata 625.

In this example, video and/or audio data 604 is received from a variety of audio/video capture devices, such as cameras 502-506 in FIG. 5. Video and/or audio data 604 is processed in smart analytics engine 618. Smart analytics engine 618 is a smart analytics engine, such as smart analytics engine 522 in FIG. 5.

Each smart analytics engine 618 can generate real-time alerts and generic event metadata. The metadata generated by smart analytics engine 618 may be represented using extensible markup language (XML). The XML documents include a set of fields which are common to all engines and others which are specific to the particular type of analysis being performed by smart analytics engine 618. In this example, the metadata generated by analytics 620. This may be accomplished via the use of, for example, web services data ingest application program interfaces (APIs) provided by analytics 620. The XML metadata is received by analytics 620 and indexed into predefined tables in multi-mode event database 602. This may be accomplished using, for example, and without limitation, the DB2™ XML extender, if an IBM® DB2™ database is employed. This permits for fast searching using primary keys. Analytics 621 provides a number of query and retrieval services based on the types of metadata available in the database.

Retrieval services 626 may include, for example, event browsing, event search, real time event alert, or pattern discovery event interpretation. Each event has a reference to the original media resource, such as, without limitation, a link to the video file. This allows the user to view the video associated with a retrieved event.

Video analysis system 600 provides an open and extensible architecture for dynamic video analysis in real time without human intervention. Smart analytics engines 618 preferably provide a plug and play framework for video analytics. The event metadata generated by smart analytics engines 618 is sent to multi-mode event database 602 in any type of programming language files, such as, without limitation, extensible markup language (XML) files. Web services API's in analytics 620 permit for easy integration and extensibility of the metadata. Various applications, such as, without limitation, event browsing, real time alerts, etc. may use structure query language (SQL) or similar query language through web services interfaces to access the event metadata from multi-mode event database 602.

Smart analytics engine 618 may be implemented as a C++ based framework for performing real-time event analysis. Smart analytics engine 618 is capable of supporting a variety of video/image analysis technologies and other types of sensor analysis technologies. Smart analytic engine 618 provides at least the following support functionalities for the core analysis components. The support functionalities are provided to programmers or users through a plurality of interfaces employed by smart analytics engine 618. These interfaces are illustratively described below.

In one example, standard plug-in interfaces may be provided. Any event analysis component which complies with the interfaces defined by smart analytics engine 618 can be plugged into smart analytics engine 618. The definitions include standard ways of passing data into the analysis components and standard ways of getting the results from the analysis components. Extensible metadata interfaces are provided. Smart analytics engine 618 provides metadata extensibility.

For example, consider a behavior analysis application which uses video capture and image analysis technology. Assume that the default metadata generated by this component is object trajectory and size. If the designer now wishes to add color of the object into the metadata, smart analytics engine 618 enables this by providing a way to extend the creation of the appropriate structures for transmission to the backend system 620. The structures may be, without limitation, extensible markup language (XML) structures or structures in any other programming language.

Smart analytics engine 618 provides standard ways of accessing event metadata in memory and standardized ways of generating and transmitting alerts to the backend system 620. In many applications, users will need the use of multiple basic real-time alerts in a spatio-temporal sequence to compose an event that is relevant in the user's application context. Smart analytics engine 618 provides a simple mechanism for composing compound alerts via compound alert interfaces. In many applications, the real-time event metadata and alerts are used to actuate alarms, visualize positions of objects on an integrated display, and control cameras to get better surveillance data. Smart analytics engine 618 provides developers with an easy way to plug-in actuation modules which can be driven from both the basic event metadata and by user-defined alerts using real-time actuation interfaces.

Using database communication interfaces, smart analytics engine 618 also hides the complexity of transmitting information from the analysis engines to multi-mode event database 602 by providing simple calls to initiate the transfer of information.

Analytics 620 and 621 may include, without limitation, a J2EE™ frame work built around IBM's DB2™ and IBM WebSphere™ application server platforms. Analytics 620 supports the indexing and retrieval of spatio-temporal event metadata. Analytics 620 also provides analysis engines with the following support functionalities via standard web services interfaces, such as, without limitation, extensible markup language (XML) documents.

Analytics 620 and 621 provide metadata ingestion services. These are web services calls which allow an engine to ingest events into analytics 620 and 621 system. There are two categories of ingestion services: 1) Index Ingestion Services: This permits for the ingestion of metadata that is searchable through SQL like queries. The metadata ingested through this service is indexed into tables which permit content based searches, such as provided by analytics 620. 2) Event Ingestion Services: This permits for the ingestion of events detected in smart analytics engine 618, such as provided by analytics 621. For example, a loitering alert that is detected can be transmitted to the backend along with several parameters of the alert. These events can also be retrieved by the user but only by the limited set of attributes provided by the event parameters.

Analytics 620 and/or 621 provide schema management services. Schema management services are web services which permit a developer to manage their own metadata schema. A developer can create a new schema or extend the base middleware for large scale analysis schema to accommodate the metadata produced by their analytical engine. In addition, system management services are provided by analytics 620 and/or 621.

The schema management services of analytics 620 and 621 provide the ability to add a new type of analytics to enhance situation awareness through cross correlation. A marketing model for a monitored retail marketing environment is dynamic and can change over time. For example, marketing strategies to sell soft drinks may be very different in December than in mid-summer. Thus, it is important to permit video analysis system 600 to add new types of analytics and cross correlate the existing analytics with the new analytics. To add/register a new type sensor and/or analytics to increase situation awareness, a developer can develop new analytics and plug them into smart analysis engine 618 and employ middleware for large scale analysis schema management service to register new intelligent tags generated by the new smart analytics engine analytics. After the registration process, the data generated by the new analytics can become immediately available for cross correlating with existing index data.

System management services provide a number of facilities needed to manage video analysis system 600 including: 1) Camera Management Services: These services include the functions of adding or deleting a camera from a MILS system, adding or deleting a map from a MILS system, associating a camera with a specific location on a map, adding or deleting views associated with a camera, assigning a camera to a specific middleware system server and a variety of other functionality needed to manage the system. 2) Engine Management Services: These services include functions for starting and stopping an engine associated with a camera, configuring an engine associated with a camera, setting alerts on an engine and other associated functionality. 3) User Management Services: These services include adding and deleting users to a system, associating selected cameras to a viewer, associating selected search and event viewing capacities to a user and associating video viewing privilege to a user. 4) Content Based Search Services: These services permit a user to search through an event archive using a plurality of types of queries.

For the content based search services (4), the types of queries may include: A) Search by Time retrieves all events from event metadata 625 that occurred during a specified time interval. B) Search by Object Presence retrieves the last 100 events from a live system. C) Search by Object Size retrieves events where the maximum object size matches the specified range. D) Search by Object Type retrieves all objects of a specified type. E) Search by Object Speed retrieves all objects moving within a specified velocity range. F) Search by Object Color retrieves all objects within a specified color range. G) Search by Object Location retrieves all objects within a specified bounding box in a camera view. H) Search by Activity Duration retrieves all events from event metadata 625 with durations within the specified range. I) Composite Search combines one or more of the above capabilities. Other system management services may also be employed.

Figure 7:
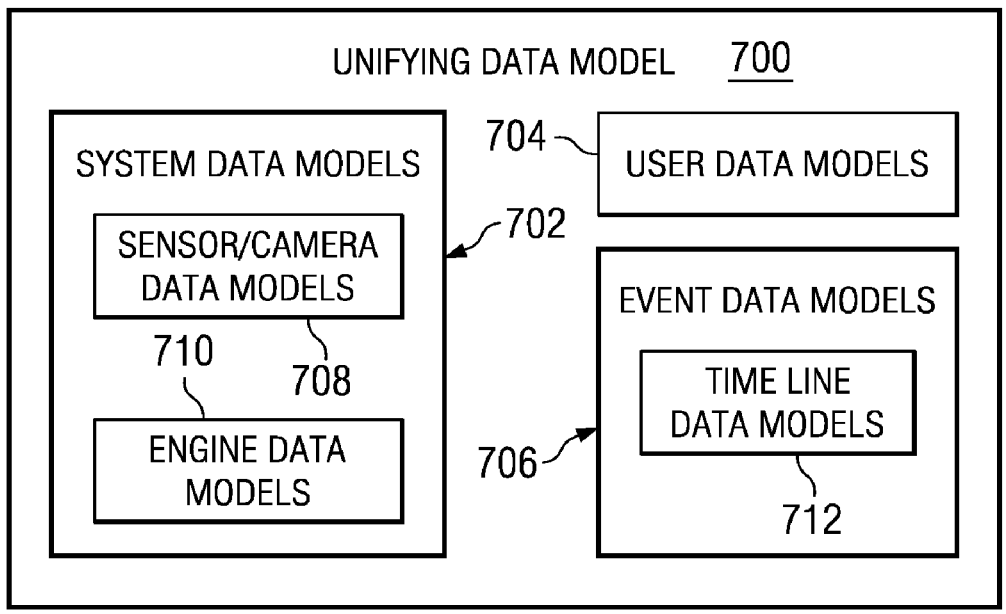
FIG. 7 is a block diagram of a unifying data model for processing event data in accordance with an illustrative embodiment.

Turning now to FIG. 7, a block diagram of a unifying data model for processing event data is depicted in accordance with an illustrative embodiment. The event data generated by video analytics, such as video analytics engine 422 in FIG. 4, is processed by an analysis server using analytics and/or one or more data models in a set of data models, such as set of data models 432 in FIG. 4, to identify patterns in the events, locations of objects, positions of objects, and identifications of objects. Unifying data model 700 is an example of a data model for processing event data.

In this example, unifying data model 700 has three types of data models, namely, 1) system data models 702 which captures the specification of a given monitoring system, including details like geographic location of the system, number of cameras deployed in the system, physical layout of the monitored space, and other details regarding the digital video environment; 2) user data models 704 models users, privileges, and user functionality; and 3) event data models 706, which captures the events that occur in a specific sensor or zone in the monitored space. Each of these data models is described below.

System data models 702 have a number of components. These may include sensor/camera data models 708. The most fundamental component of these sensor/camera data models 708 is a view. A view is defined herein as some particular placement and configuration, such as a location, orientation, and/or parameters, of a sensor. In the case of a camera, a view would include the values of the pan, tilt, and zoom parameters, any lens and camera settings, and position of the camera. A fixed camera can have multiple views. The view "Id" may be used as a primary key to distinguish between events being generated by different sensors. A single sensor can have multiple views. Sensors in the same geographical vicinity are grouped into clusters, which are further grouped under a root cluster. There is one root cluster per MILS server.

Engine data models 710 provide a comprehensive security solution which utilizes a wide range of event detection technologies. Engine data model 710 captures at least some of the following information about the analytical engines: engine identifier, engine type, and engine configuration. The engine identifier is a unique identifier assigned to each engine. The engine type denotes the type of analytic being performed by the engine. The type of analytic being performed may include, for example, and without limitation, face detection, behavior analysis, and/or license plate recognition. The engine configuration captures the configuration parameters for a particular engine.

User data models 704 captures the privileges of a given user. These may include selective access to camera views; selective access to camera/engine configuration and system management functionality; and selective access to search and query functions.

Event data models 706 represent the events that occur within a space that may be monitored by one or more cameras or other sensors. Event data models 706 may incorporate time line data models 712 for associating the events with a time. By associating the events with a time, an integrated event may be defined. An integrated event is an event that may include multiple sub-events. Time line data model 712 uses time as a primary synchronization mechanism for events that occur in the real world, which is monitored through sensors. The basic middleware system schema allows multiple layers of annotations for a given time span.

Figure 8:
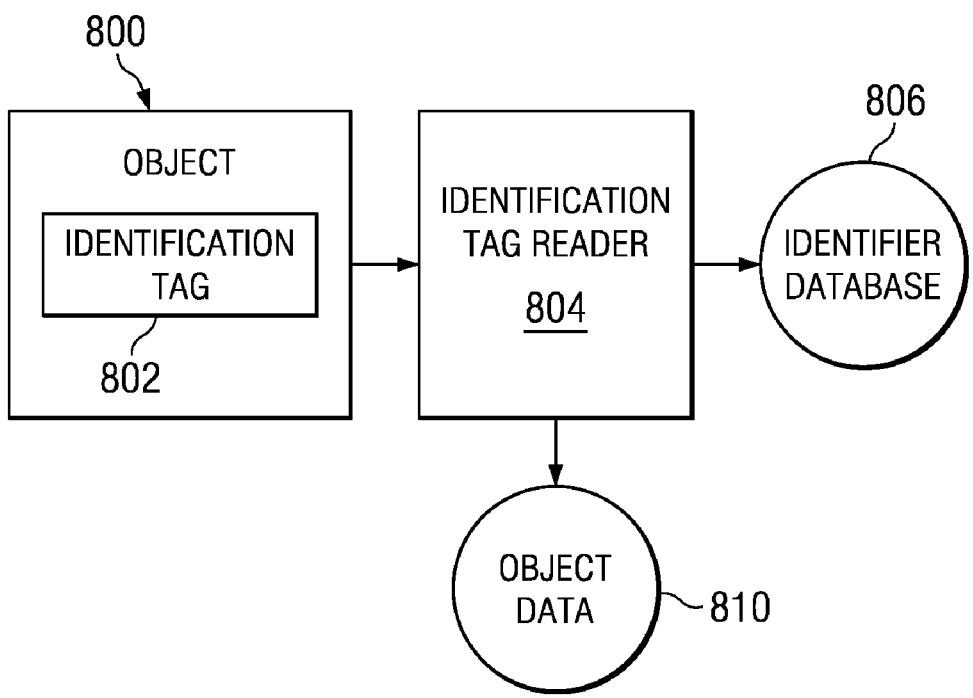
FIG. 8 is a block diagram of an identification tag reader for identifying objects within an area of interest in accordance with an illustrative embodiment.

Turning now to FIG. 8, a block diagram of an identification tag reader for identifying objects within an area of interest is shown in accordance with an illustrative embodiment. Object 800 is any type of object, such as object 408 in FIG. 4 or an object in set of objects 507 in FIG. 5.

Identification tag 802 associated with object 800 is a tag for providing information regarding object 800 to identification tag reader 804. Identification tag 802 may be an employee badge or other identification badge, a radio frequency identification tag, a global positioning system (GPS) tag, and/or any other type of tag for providing information regarding an object associated with identification tag 802.

Radio frequency identification tags may be implemented as, without limitation, read-only identification tags, read-write identification tags, passive radio frequency identification tags, and/or active radio frequency identification tags. A read-only identification tag is a tag that generates a signal in response to receiving an interrogate signal from an object identifier. A read-only identification tag does not have a memory. A read-write identification tag is a tag that responds to write signals by writing data to a memory within the identification tag. A read-write tag can respond to interrogate signals by sending a stream of data encoded on a radio frequency carrier. The stream of data can be large enough to carry multiple identification codes. In this example, identification tag 802 is a radio frequency identification tag.

Identification tag reader 804 is any type of known or available device for retrieving information from identification tag 802, such as, without limitation, badge reader technology 614 in FIG. 6. Identification tag reader 804 may be, but is not limited to, a radio frequency identification tag reader or a bar code reader. A bar code reader is a device for reading a bar code, such as a universal product code. In this example, identification tag reader 804 provides object data 810 to an analysis server, such as analysis server 426 in FIG. 4.

Object data 810 is information regarding object 800, such as, without limitation, data regarding the product name, a person's name, a license plate number of a vehicle, an identifier for the object, manufacturer name of the object, or any other information identifying or describing the object.

Identifier database 806 is a database for storing any information that may be needed by identification tag reader 804 to read identification tag 802. For example, if identification tag 802 is a radio frequency identification tag, identification tag will provide a machine readable identification code in response to a query from identification tag reader 804. In this case, identifier database 806 stores description pairs that associate the machine readable codes produced by identification tags with human readable descriptors. For example, a description pair for the machine readable identification code "10141014111111" associated with identification tag 802 would be paired with a human readable object description of object 800, such as "John Smith." An object description is a human understandable description of an object. Human understandable descriptions are for example, text, audio, graphic, or other representations suited for display or audible output.

Figure 9:
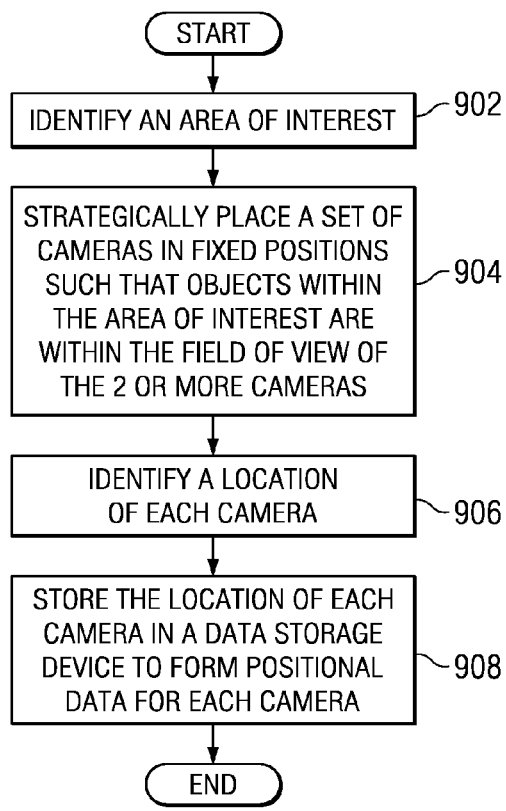
FIG. 9 is a flowchart of a process for calibrating a set of cameras in an area of interest in accordance with an illustrative embodiment.

FIG. 9 is a flowchart of a process for calibrating a set of cameras in an area of interest in accordance with an illustrative embodiment. The process may be implemented, without limitation, by a human user.

The process begins by identifying an area of interest (step 902). A set of two or more cameras are strategically placed in locations such that objects within the area of interest are within the field of view of the two or more cameras (step 904). A location of each camera in the set of cameras is identified (step 906). The location of each camera is stored in a data storage device to form positional data for each camera in the set of two or more cameras (step 908) with the process terminating thereafter.

Figure 10:
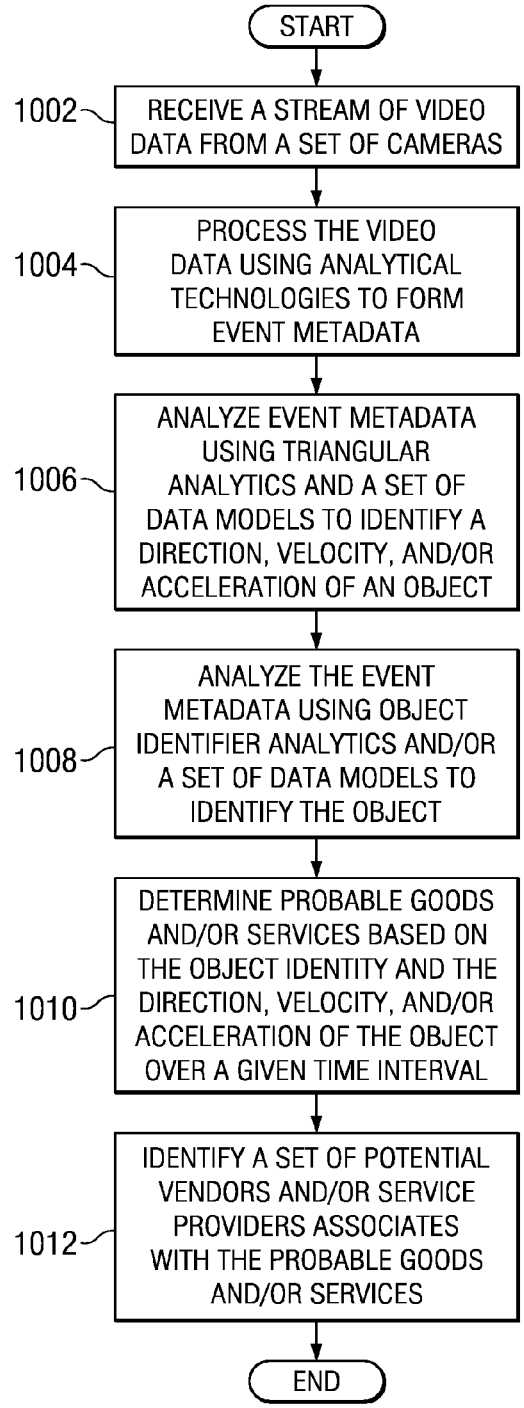
FIG. 10 is a flowchart illustrating a process for identifying a direction, velocity, and acceleration of an object in accordance with an illustrative embodiment.

FIG. 10 is a flowchart illustrating a process for identifying a direction, velocity, and acceleration of an object in accordance with an illustrative embodiment. The process is implemented by software for identifying a direction, velocity, and acceleration of an object using images of the object captured by a set of cameras, such as video analysis system 520 in FIG. 5.

The process begins by receiving a continuous stream of video data from a set of two or more cameras (step 1002). The video analysis system analyzes the video data using analytical technologies from event metadata (step 1004). The analytical technologies are analytics, such as, without limitation, video analytics engine 522 in FIG. 5 and smart analytics engines 518 in FIG. 5.

The video analysis system analyzes the event metadata using triangulation analytics and a set of one or more data models to identify a direction, velocity, and/or acceleration of the object (step 1006). The set of one or more data models may be a null set having no data models, a single data model, or two or more data models. The video analysis system analyzes the event metadata using object identifier analytics and a set of one or more data models to identify the object (step 1008). Again, the set of one or more data models may be a null set having no data models, a single data model, or two or more data models.

The video analysis system optionally determines probable goods and/or services that may be desired based on the object identity and the direction, velocity, and/or acceleration of the object over a given time interval (step 1010). The video analysis system then identifies a set of potential vendors and/or service providers associated with the identified probable goods and/or services (step 1012) with the process terminating thereafter.

Figure 11:
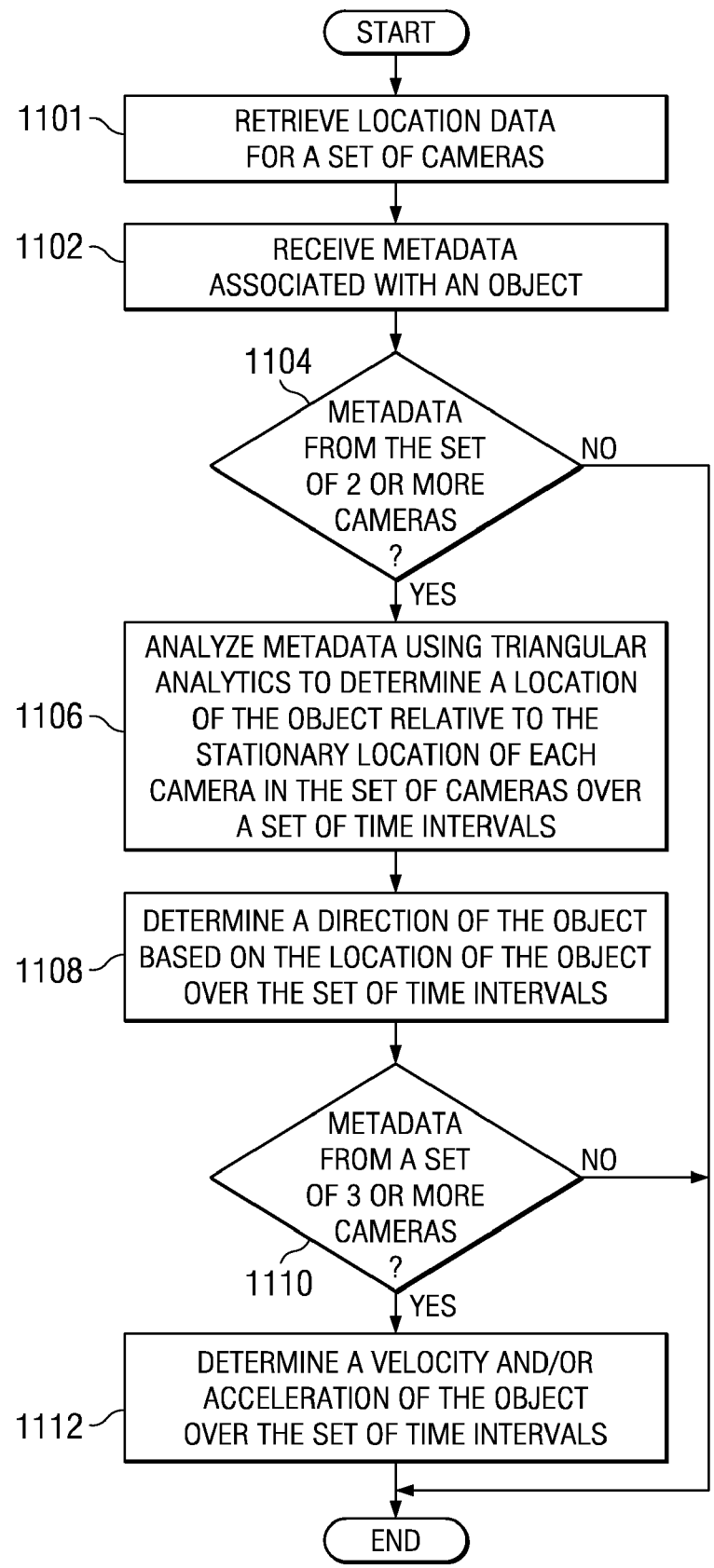
FIG. 11 is a flowchart illustrating a process for analyzing metadata to determine a direction, velocity, and acceleration of an object in accordance with an illustrative embodiment.

FIG. 11 is a flowchart illustrating a process for analyzing metadata to determine a direction, velocity, and acceleration of an object in accordance with an illustrative embodiment. The process is implemented by software for analyzing event metadata describing an object, such as, without limitation, analysis server 526 in FIG. 5.

The process begins by retrieving location data for a set of cameras associated with an object (step 1101). The location data identifies a location of each camera in the set of cameras within the area of interest. The object is within an image capture range of each camera in the set of cameras.

Metadata associated with an object is then received (step 1102). The metadata describes events in video data captured by the set of cameras. Events in the video data are any event, feature, or characteristic of the object. Events may include the make, model, and year of a vehicle, the color of a vehicle, the height of a person, the pace at which a person is walking, the features of a person's face, a person pushing a cart or carrying a bag, or any other event. The metadata is generated automatically in real time as the video data is captured by the set of cameras The analysis server makes a determination as to whether the metadata was generated from video data received from a set of two or more cameras (step 1104). If the metadata for the object is not associated with video data from at least two cameras, the process terminates. If the set of cameras associated with the metadata for the object has at least two cameras, the analysis server analyzes the metadata using triangulation analytics to determine a location of the object relative to the location of each camera in the set of cameras (step 1106). The analysis server determines a direction of the object based on the location of the object over the set of time intervals (step 1108).

The analysis server makes a determination as to whether the set of cameras includes three or more cameras (step 1110). If the set of cameras does not include at least three cameras capturing image data of the object that is converted into the metadata for the object, the process terminates thereafter. If the set of cameras does include three or more cameras, the analysis server determines a velocity and/or an acceleration of the object over the set of time intervals (step 1112) with the process terminating thereafter.

The illustrative embodiments provide a computer implemented method, apparatus, and computer program product for identifying positional data for an object moving in an area of interest. In one embodiment, positional data for each camera in a set of cameras is associated with the object is retrieved. The positional data identifies a location of the each camera in the set of cameras within the area of interest. The object is within an image capture range of the each camera in the set of cameras. Metadata describing video data captured by the set of cameras is analyzed using triangulation analytics and the positional data for the set of cameras to identify a location of the object. The metadata is generated in real time as the video data is captured by the set of cameras. The positional data for the object is identified based on locations of the object over a given time interval. The positional data describes motion of the object.

Thus, the digital video system enables a user to determine an object's velocity, acceleration, and/or direction without relying on radar and/or laser radar technologies. The video analysis system receives a continuous feed of video data from two or more cameras strategically placed in an internal and/or external environment. The triangulation of the data collection makes it possible to determine speed, acceleration, and/or direction of an object. For example, the digital video system is capable of identifying a speeding car or a car that is braking hard rather than braking gradually. The video analysis system is capable of determining the direction an object is traveling and the speed at which the object is traveling without using radar or laser radar technologies. The video analysis system minimizes the false positive and false negatives that may result with regard to radar and laser radar technologies. The video analysis system eliminates the problems and dangers associated with laser radar technology.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for identifying positional data for an object in motion, the computer implemented method comprising:
    retrieving location data a set of cameras associated with the object, wherein the location data identifies a location of each camera in the set of cameras within an area of interest, and wherein the object is within an image capture range of the each camera in the set of cameras;
    analyzing metadata associated with the object using triangulation analytics and the location data for the set of cameras to identify a location of the object at a point in time, wherein the metadata describes events in video data captured by the set of cameras, and wherein the metadata is generated automatically in real time as the video data is captured by the set of cameras;
    identifying the positional data for the object based on locations of the object over a given time interval, wherein the positional data describes motion of the object; and
    analyzing metadata describing the object using object identification analytics to identify the object.

2. The computer implemented method of claim 1 wherein the set of cameras comprises two or more cameras, and wherein the positional data comprises a direction of motion of the object.

3. The computer implemented method of claim 1 wherein the set of cameras comprises three or more cameras, and wherein the positional data comprises a velocity of the motion of the object.

4. The computer implemented method of claim 1 wherein the set of cameras comprises three or more cameras and wherein the positional data comprises an acceleration of the object over time.

5. The computer implemented method of claim 1 further comprising:
    analyzing the metadata using a set of data models, wherein the set of data models comprises at least one of a statistical method, a data mining method, a causal model, a mathematical model, a marketing model, a psychological model, a sociological model, a simulation model or a unifying data model.

6. The computer implemented method of claim 1 further comprising:
    receiving a continuous video stream from the set of cameras, wherein the set of cameras is located with the area of interest to form video data, and wherein the object is within an image capture range of each camera in the set of cameras; and
    processing the video data using video analytics to generate the metadata describing the object.

7. The computer implemented method of claim 6 wherein the video analytics comprises at least one of behavior analysis analytics, license plate recognition analytics, and facial recognition analytics, wherein behavior analysis analytics excludes analysis of movement.

8. The computer implemented method of claim 1 further comprising:
    generating the location data for the set of cameras using data from a global positioning system receiver associated with the each camera.

9. The computer implemented method of claim 1 wherein the positional data for the object comprises a direction, velocity, and acceleration of the object and further comprising:
    identifying probable goods and services desirable for the object based on the direction, velocity, and acceleration of the object over a set of time intervals; and
    identifying a set of vendors and service providers associated with providing the probable goods and services.

10. A computer program product for identifying positional data for an object in motion, the computer program product comprising:
    a non-transitory computer readable medium;
    program code stored on the computer readable medium for retrieving location data a set of cameras associated with the object, wherein the location data identifies a location of each camera in the set of cameras within an area of interest, and wherein the object is within an image capture range of the each camera in the set of cameras;

program code stored on the computer readable medium for analyzing metadata associated with the object using triangulation analytics and the location data for the set of cameras to identify a location of the object at a point in time, wherein the metadata describes events in video data captured by the set of cameras, and wherein the metadata is generated automatically in real time as the video data is captured by the set of cameras;

program code stored on the computer readable medium for identifying the positional data for the object based on locations of the object over a given time interval, wherein the positional data describes motion of the object; and program code stored on the computer readable medium for analyzing metadata describing the object using object identification analytics to identify the object.

11. The computer program product of claim 10 wherein the set of cameras comprises two or more cameras and wherein the positional data is a direction of motion of the object.

12. The computer program product of claim 10 wherein the set of cameras comprises three or more cameras and wherein the positional data is a velocity of the motion of the object.

13. The computer program product of claim 10 wherein the set of cameras comprises three or more cameras and wherein the positional data is an acceleration of the object over time.

14. The computer program product of claim 10 further comprising:

program code stored on the computer readable medium for receiving a continuous video stream from the set of cameras, wherein the set of cameras is located with the area of interest to form video data, and wherein the object is within an image capture range of each camera in the set of cameras; and program code stored on the computer readable medium for processing the video data using video analytics to generate the metadata describing the object.

15. The computer program product of claim 14 wherein the video analytics comprises at least one of behavior analysis analytics, license plate recognition analytics, and facial recognition analytics, wherein behavior analysis analytics excludes analysis of movement.

16. The computer program product of claim 10 further comprising:

program code stored on the computer readable medium for generating the location data for the set of cameras using data from a global positioning system receiver associated with the each camera.

17. The computer program product of claim 10 wherein the positional data for the object comprises a direction, velocity, and acceleration of the object and further comprising:

program code stored on the computer readable medium for identifying probable goods and services desirable for the object based on the direction, velocity, and acceleration of the object over a set of time intervals; and program code stored on the computer readable medium for identifying a set of vendors and service providers associated with providing the probable goods and services.

18. An apparatus comprising:
a bus system;
a communications system coupled to the bus system;
a memory connected to the bus system, wherein the memory includes computer usable program code; and
a processing unit coupled to the bus system, wherein the processing unit executes the computer usable program code to retrieve positional data for each camera in a set of cameras associated with an object, wherein the positional data identifies a location of the each camera in the set of cameras within an area of interest, and wherein the object is within an image capture range of the each camera in the set of cameras; analyze metadata describing video data captured by the set of cameras using triangulation analytics and the positional data for the set of cameras to identify a location of the object, wherein the metadata is generated in real time as the video data is captured by the set of cameras; identify the positional data for the object based on locations of the object over a given time interval, wherein the positional data describes motion of the object; and analyze metadata describing the object using object identification analytics to identify the object.

19. The apparatus of claim 18 wherein the processing unit further executes the computer usable program code to receive a continuous video stream from the set of cameras, wherein the set of cameras is located with the area of interest to form video data, and wherein the object is within an image capture range of each camera in the set of cameras; and process the video data using video analytics to generate the metadata describing the object.

20. A system for identifying positional data for an object in motion, the system comprising:

a set of cameras associated with an object in an area of interest, wherein the object is within an image capture range of each camera in the set of cameras;

a video analysis server, wherein the video analysis server retrieves location data for the set of cameras, wherein the location data identifies a location of each camera in the set of cameras within the area of interest and analyze metadata associated with the object using triangulation analytics and the location data for the set of cameras to identify a location of the object at a point in time, wherein the metadata describes events in video data captured by the set of cameras, and wherein the metadata is generated automatically in real time as the video data is captured by the set of cameras; identify the positional data for the object based on locations of the object over a given time interval, wherein the positional data describes motion of the object; and analyze metadata describing the object using object identification analytics to identify the object.

21. The system of claim 20 further comprising:
a video analysis engine, wherein the video analysis engine receives a continuous video stream from the set of cameras to form video data, and wherein the video analysis engine processes the video data using video analytics to generate the metadata describing the object.

22. The system of claim 20 wherein the set of cameras comprises two or more cameras, and wherein the positional data is a direction of motion of the object.

23. The system of claim 20 wherein the set of cameras comprises three or more cameras, and wherein the positional data comprises a velocity of the motion of the object and an acceleration of the object over time.

24. The computer implemented method of claim 1, wherein the step of analyzing metadata describing the object using object identification analytics to identify the object further comprises classifying the object into a number of categories.

* * * * *